United States Patent Office 3,445,008
Patented May 20, 1969

3,445,008
HANDLING OF PARTICULATE SHIP CARGO
Ludwig W. Koch, Ponca City, Okla., assignor to Continental Oil Company, Ponca City, Okla., a corporation of Delaware
Filed Sept. 29, 1966, Ser. No. 582,815
Int. Cl. B63g 53/30, 53/60
U.S. Cl. 214—14   7 Claims

ABSTRACT OF THE DISCLOSURE

A system is provided for unloading solids from a ship's hold by forming a slurry, wherein a low pressure liquid fluidizes the solids at the bottom of the hold and the resulting fluid is picked up by adjacent eductors operated by high pressure liquid; the system can be readily installed in e.g. an existing oil tanker.

---

Figure 1:
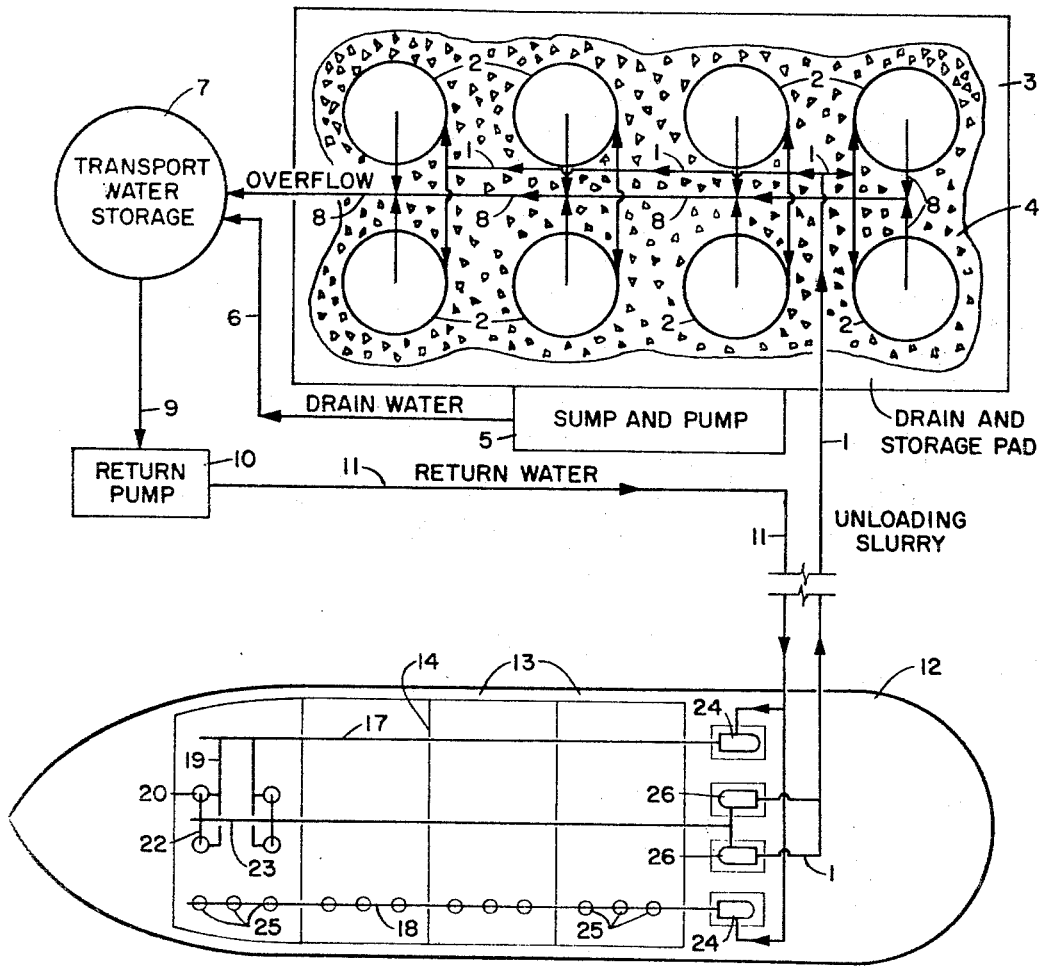

This invention relates to method and apparatus for handling particulate ship cargo. In one aspect, the invention relates to method and apparatus whereby a particulate cargo is unloaded from the hold of a ship by flooding a lower portion of the hold, educting the particulate cargo from the hold as a slurry of solids in transport liquid, and passing the slurry to an on-shore installation for separation into its solids and transport liquid components. In another aspect, the invention relates to method and apparatus for inexpensively adapting existing oil tanker ships to the subject system.

It has long been realized that one of the most convenient and economical methods of handling particulate or finely divided solids is to handle them as a suspension or slurry in a gaseous or liquid medium. This is so because hydraulic or pneumatic systems are generally less expensive initially, more mobile, and require less maintenance than a mechanical conveying system. In spite of this, it has been the general practice in the industry to load and unload particulate solids from a ship by such mechanical devices as dockside cranes, conveyor belts, trucks, etc. This practice has primarily been due to the fact that prior art hydraulic transport systems have required substantial investment in the necessary and elaborate ship-board facilities, and further that a ship once so constructed is virtually limited to handling such particulate cargo.

Figure 2:
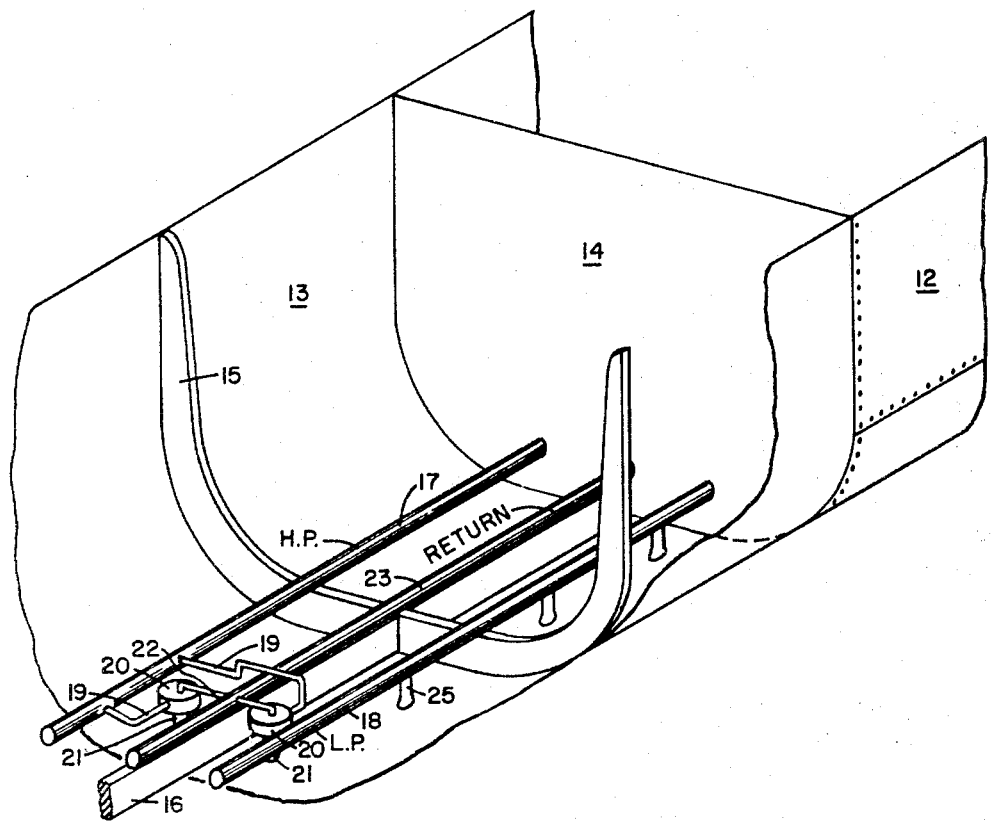

Accordingly, it is an object of this invention to provide relatively simple and inexpensive method and apparatus for handling particulate cargo for a ship. It is another object of the invention to provide a method for converting existing liquid-cargo ships to handle particulate material. Other aspects, objects, and the several advantages of this invention will become apparent upon study of this disclosure, the appended claims, and the drawing, in which:

FIGURE 1 is a schematic plan view of an unloading facility according to one embodiment of this invention, and FIGURE 2 is a schematic isometric view of the piping aboard a cargo ship according to this invention.

Reference is now made to the drawing, and to FIGURE 1 in particular. A cargo ship is indicated generally as 12; the remainder of the drawing illustrates the on-shore portion of the unloading facility. Considering first the on-shore portion, a slurry of solids in a suitable transport liquid such as water comes from shipboard to the facility via a conduit 1. This slurry is passed to one or more separators, such as cyclone separators 2. These separators can be so sized that any one will handle the entire slurry stream, or can be smaller such that two or more separators are operated in parallel. In any event, the feed conduit 1 is provided with valves (not shown) at the inlet of each separator, as will be understood, so that various combinations of separators can be selected for on-stream duty. The separators are supported on a superstructure, not shown, some distance above a concrete pad 3 or other suitable drainage area. Separators 2 can also be filters or decantation tanks, but preferably are solid-liquid cyclones. The thickened solids from the separators, e.g. the cyclone underflow, falls by gravity onto drainage area 3 and forms a pile of wet solids 4. The drainage area is so sloped that remaining liquids from the pile 4 flow to a sump pit 5, from whence they are pumped via conduit 6 to a storage tank 7. Returning to the separators 2, a clarified or low solids content liquid stream from the separator is collected and passed via conduit 8 to storage tank 7; this conduit 8 is also suitably valved in a manner similar to conduit 1, and comprises, in the instance of cyclone separators, the cyclone overflow. Transport liquids are collected in tank 7, which is sized to allow relatively quiescent conditions during operation so that any remaining solids will settle out, and can be periodically removed. Storage tank 7 can be a closed tank, or alternatively can comprise an open settling pond, as is known in the art. Clarified liquid is pumped by pump 10 via conduits 9 and 11 back to the ship to effect unloading, as will now be explained.

Cargo ship 12 is divided into a number of compartments or holds 13, which have previously been loaded with particulate solids such as phosphate rock. The general system of unloading according to this invention comprises first flooding a hold with transport liquid, then fluidizing the solids in a lower portion of the hold with additional transport liquid, and finally educting the solids as a slurry using as motive power additional transport liquid. Operation of this portion of the system can best be understood by reference to FIGURE 2. In FIGURE 2 there is shown a portion of one hold 13 of a ship 12, with the usual bulkhead 14, ribs 15 and keel 16. The typical oil tanker ship is provided with a plurality of conduits 17 and 18 which traverse the length of the ship at or near the bottom of the holds, these being normally used for loading and unloading liquid cargo such as oil. Although only two such conduits are shown here for clarity, there will normally be e.g. four or more, and these will be suitably valved so as to be able to isolate one or more holds by remote control. When a ship is built or adapted to the present invention, one or more of these conduits will be used for high pressure transport fluid, e.g. conduit 17, and one or more will be used for low pressure transport fluid, e.g. conduit 18. By "high pressure" I mean a pressure of at least about 80 p.s.i. and preferably at least about 125 p.s.i., and by "low pressure" I mean that pressure is not critical, and can be at any value above about 10 p.s.i. or enough to overcome fluid back pressure head. The transport fluid in these various conduits arrives aboard ship via conduit 11, and is pressured to the desired values by pumps aboard ship, which are normally a part of the existing equipment on an oil tanker, used for loading and unloading. Such pumps are shown as items 24 in FIGURE 1. The high pressure liquid passes from conduit 17 through a plurality of branch conduits 19 to a plurality of eduction devices 20, of which there will be at least one, and preferably several, in each hold to be unloaded. Eductors 20 are provided with downwardly-extending pick-up tubes 21, which extend to within a short distance, e.g. one or two inches, of the bottom of the hold. A slurry of particulate solids in transport fluid is drawn into eductors 20 via pick-ups 21 by virtue of motive power supplied by high pressure fluid from conduits 19, and the slurry is then forced by return branch conduits 22 to main return conduit 23 and thence onshore via conduit 1. In connection with the slurry return conduit it should be noted that one or more slurry booster pumps can be placed in this line in the event that the ship cannot approach close to the shore and requires lengthy slurry and return lines. Two such pumps in parallel are shown in FIGURE 1 as items 26. These and pumps 24 are provided with suitable drive means. Further, this return conduit 23 can be located within the hold, as shown in the drawing, or alternatively can be located above the deck of the ship, in which instance return branch conduits 22 will comprise vertical risers from the hold-located eductors 20 to the deck-located return conduit 23. Low pressure conduit 18 will in the typical oil tanker have been provided with a plurality of suction nozzles or openings 25, which would be used in normal oil service for loading or unloading via conduit 18; in the present invention, they serve to distribute low pressure transport fluid in the hold for the purposes of flooding and/or fluidizing. Suitable eductors for use as items 20 include annular jets made by Meckum Engineering Company, Ottawa, Ill.; center jets made by Hydro-Jet Corporation, Amarillo, Tex. and center or peripheral jets made by Derbyshire Machine & Tool Company, Philadelphia, Pa.

To recapitulate, the items necessary for converting a typical existing oil tanker to service according to the present invention are as follows: add branch supply conduits 19, educators 20, pick-ups 21, branch return conduits 22, and return conduit 23, and replace or modify as necessary pumps 24 and 26. Of course, a ship can be specifically designed and built for service according to the present invention.

In operation, unloading of particulate solids is effected by initially flooding the hold to at least a depth sufficient to maintain the eductor pick-up tubes 21 immersed; the flooding can be carried to the extent of immersing the entire cargo in a given hold, but need not be. This immersion is effected with transport liquid from storage tank 7 introduced by way of conduit 18 and nozzles 25. The eductors 20 are then activated by introducing additional transport fluid from tank 7 at high pressure by way of conduit 17 and branch conduits 19, which causes the solid cargo to be picked up as a slurry and passed by way of conduits 22 and 23, pump 26, and conduit 1 to the on-shore facility. Here the slurry is separated by separators 2 into wet solids, which drop as pile 4, and clarified transport liquid, which is returned by way of conduits 8 to storage tank 7. The wet solids in pile 4 will also drain of transport fluid, which collects in sump 5 for return via conduit 6 to storage tank 7.

The present invention can handle any particulate solids capable of forming a slurry, i.e. of a particle size sufficiently small to be handled as a suspension in liquid in a piping system of a given diameter. An accepted rule is to use a pipe diameter of at least three times as large as the largest particle to be handled. Solids up to 1″ and more in diameter can be so handled, as is recognized in the art. Examples of such material are coal, cereal grain, ores such as phosphate rock or iron ore, etc. Although the preferred transport fluid is water simply because of its low cost, it will be recognized that any other liquid can be used. Of course, highly flammable or volatile fluids should be avoided unless the appropriate precautions are taken. Water soluble salts such as sodium chloride can be handled by this system in one of two manners. A transport fluid can be chosen in which the salt has a very low solubility, such as an alcohol, kerosene, etc. or a saturated solution or brine of the salt can be used. In either instance, losses of solids and transport fluid are very low because the fluid inventory is maintained in a "closed," i.e. completely recycled, system. The only losses are by way of fluid evaporation and moisture retained in the solids product pile 4. Once placed in pile 4, the solids can of course be handled in conventional manner, e.g. by conveyor belt, truck, front-loader, etc.

In another embodiment of the on-shore facility, one or more separators 2 are movably mounted on the superstructure, e.g. on a traveling beam. Feed conduits 1 and overflow conduits are in this instance flexible or swivel-jointed. In this embodiment, the separators 2 can be moved during operation so as to spread or distribute pile 4 on the drain pad 3, or even so as to discharge directly into trucks or onto, e.g., a conveyor belt.

The invention will now be further illustrated by reference to the following example.

EXAMPLE

Phosphate rock solids of a particle size ranging from 4 to 150 mesh arrive in a ship having 5 holds, each hold containing on the average 5,000 tons of rock, which is about 100,000 cubic feet. Low pressure water at about 15 p.s.i. is introduced by way of nozzles 25 in an amount of about 100,000 gallons initially, which produces a liquid depth in the hold of about 10 feet. High pressure water at a pressure of about 150 p.s.i. is then passed to eductors 20, which number 2 per hold, at a rate of about 3000 g.p.m. The resulting slurry contains about 40 weight percent solids, and is passed by way of conduit 23 and pump 26 to shore. Additional low pressure water is introduced into the hold by way of nozzles 25 and impingement hoses from above deck at a rate of about 1500 g.p.m. during the unloading of one hold. The slurry on shore is passed to 5 separators 2, which separate a solids product of about 65–70 percent moisture initially at a rate of about 800 tons per hour. Overhead water from the cyclones containing only traces of solids is produced at a rate of about 3200 g.p.m., and is passed to tank 7. Drain water from pad 3 amounts to about 1000 g.p.m., and is also passed to tank 7. Tank 7 has a capacity of about 1,000,000 gallons. Unloading one hold requires about 6 hours.

Reasonable variation and modification are possible within the scope of this invention, and the preceding example is to be taken as illustration and not limitation.

What is claimed is:
1. Apparatus for unloading particulate solids from a hold of a ship, which apparatus comprises:
  (a) liquid storage means on a shore,
  (b) means for passing liquid from said storage means to a plurality of parallel pumping means aboard said ship,
  (c) nozzle means located in a bottom region of said hold,
  (d) low pressure pumping means connected to said means for passing, and to said nozzle means,
  (e) eduction means located adjacent said nozzle means,
  (f) high pressure pumping means connected to said means for passing, and to said eduction means,
  (g) collecting means for collecting effluent from said eduction means,
  (h) separation means on said shore for separating solids from liquid,
  (i) conduit means connecting said collecting means and said separation means, and
  (j) means for passing liquid from said separation means to said storage means.

2. The apparatus of claim 1 further provided with means to receive wet solids from said separation means and adapted to permit drainage of liquid therefrom, and means for collecting thus-drained liquid and returning same to said storage means.

3. The apparatus of claim 1 wherein said separation means comprise solids-liquids cyclone separation means.

4. The method of unloading particulate solids from a ship which comprises providing a reservoir zone of liquid on an adjacent shore, passing liquid from said reservoir zone to said ship, pumping a portion of the thus-passed liquid to a bottom portion of said solids in said ship in amount sufficient to immerse at least said bottom portion, pumping parallel to said first pumping a second portion of the thus-passed liquid at a pressure of at least about 80 p.s.i.a. to an eduction zone in said bottom portion so as to produce a slurry of said solids in thus-passed liquid, conducting said slurry to said shore, separating said slurry into a wet solids phase and a liquid phase, and returning said liquid phase to said reservoir zone.

5. The method of claim 4 wherein additional liquid is collected by drainage from said wet solids phase and is returned to said reservoir zone.

6. The method of claim 5 wherein said solids comprise particulate phosphate rock and said liquid comprises water.

7. A ship for transporting particulate solids cargo comprising a hold, a low pressure pump and drive means therefor, a high pressure pump capable of producing a discharge pressure of at least about 80 p.s.i.a. and drive means therefor, conduit means connected to the inlets of said low and said high pressure pumps in parallel and adapted to connect to an on-shore source of liquid, nozzle means in a bottom portion of said hold, conduit means connected to the discharge of said low pressure pump and to said nozzle means, eductor means adjacent said nozzle means and adapted to educt a slurry of solids from said bottom portion of said hold, conduit means connected to the discharge of said high pressure pump and to said eductor means, and conduit means connected to the discharge of said eductor means and adapted to connect to an on-shore separation means.

References Cited

UNITED STATES PATENTS

| 1,127,137 | 2/1915 | West | 214—15 |
| 1,908,220 | 5/1933 | Chapman | 302—14 X |
| 3,305,106 | 2/1967 | Ishino | 214—14 |

HUGO O. SCHULZ, *Primary Examiner.*

FRANK E. WERNER, *Assistant Examiner.*

U.S. Cl. X.R.

214—152